UNITED STATES PATENT OFFICE.

JAMES A. WHITNEY, OF NEW YORK, N. Y.

PRESERVATION OF MEAT BY REFRIGERATION.

SPECIFICATION forming part of Letters Patent No. 249,434, dated November 8, 1881.

Application filed August 11, 1880. (No model.)

*To all whom it may concern:*

Be it known that I, JAMES A. WHITNEY, of the city, county, and State of New York, have invented certain Improvements in the Preservation of Meat by Refrigeration, of which the following is a specification.

In the preservation of meats by refrigeration according to the usual methods the meat is hung or placed in a closed chamber and there subjected to the action of chilled air. By this means, however, from five to six times as much space is required as would be necessary if the quarters, carcasses, or pieces of meat could be packed in close relation with each other.

The object of my invention is to provide a means by which the preservative effects of refrigeration may be exerted upon the meat when the same is closely packed, by which means the cost of transporting meat under refrigeration is reduced to from one-sixth to one-fifth of its cost by the usual methods, and whereby, also, certain other considerable advantages are secured.

In carrying my said invention into effect I provide a closed chamber, the ceiling, floor, and sides, including the door or place of access, of which are so constructed as to be, to the greatest practicable extent, impervious to the transmission of heat. In other words, the said ceiling, floor, and sides of the said chamber should, as nearly as possible, be made non-conductors of heat. Any suitable construction of said ceiling, floor, and walls (the door or place of access included) may be adopted, the same general principles governing the said construction as are observed in the well-known construction of the corresponding parts of ordinary refrigerating-boxes, or "chill-rooms," so termed.

Preparatory to practice of my invention aforesaid the chamber should be reduced by any suitable or usual means to as low a temperature as possible, in order that the sensible heat may be removed from the ceiling, floor, and walls of the said chamber.

In the practice of my said invention I take sand or other granular or pulverulent material of such a character that it will communicate no contamination of any kind to the meat. Although the presence of a moderate degree of moisture in this material will be productive of no considerable harm, it is designed that it be of a substantially dry character—that is to say, incapable of yielding a quantity of water sufficient to injuriously affect the surface of the meat around which it is packed, as hereinafter explained. This material I refrigerate to a temperature which, in practice, may reach a little below 32° Fahrenheit, (0° centigrade,) inasmuch as a small portion of the cold, so to speak, will be lost during the manipulation of the material in packing the meat. This temperature, however, should not be low enough to subject the meat, when packed therein, as hereinafter explained, to a freezing action, the object being to maintain the meat at the lowest temperature possible without freezing the juices thereof. This refrigeration of the granular or pulverulent material may be produced or procured by any appropriate means—as, for example, by refrigerating it in an ice-house of any suitable construction, or by employing an apparatus analogous to ice-making machines, and so constructed as to operate upon the granular or pulverulent material instead of water, many of the said ice-making machines being of such construction that it is only necessary to place the aforesaid material in the water-receptacles and subject the same to the cooling agency in the same manner that the water is acted upon thereby. Inasmuch as apparatus for cooling water to produce ice are well known, it is not necessary to describe in detail those which would be applicable to the purpose of cooling the granular or pulverulent material, as hereinbefore explained. The said material should be kept at its low temperature when admitted into or placed within the chamber hereinbefore referred to.

The meat to be subjected to refrigeration, either in the form of quarters, as in the case of beef, or in that of carcasses, as in the case of sheep, or, if preferred, in pieces of any suitable size and shape, is enveloped in a covering of common cotton cloth or other suitable fibrous material, sewed snugly thereon. The object of the said covering of woven fabric or fibrous material is to protect the meat from immediate contact with the granular or pulverulent material, and at the same time to permit the escape from the meat of vapors, gases, &c., which, if retained within a close or impervious covering, would tend to deteriorate the quality of the meat. Before being placed in the chamber aforesaid the meat should be placed in an ordinary refrigerator or chill-room of any suitable construction and cooled or chilled to as low a temperature as possible above the freezing-point. The meat, being thus chilled and covered with fabric or fibrous material, as aforesaid, is taken to the chamber aforesaid, and is there packed in the refrigerated sand or other suitable refrigerated granular or pulverulent material.

The quarters, carcasses, or pieces of meat should not be packed in contact with each other, but there should be a sufficient thickness of the refrigerated material between the quarters, carcasses, or pieces of meat, as the case may be, to provide a body of the cold material packed snugly against each and all of the said quarters, carcasses, or pieces. Care should also be taken to interpose a proper thickness of the cooled or chilled material between the meat and the adjacent sides, floor, or ceiling, as the case may be, of the chamber.

The operation may, of course, be most conveniently performed by first spreading a layer of the cooled or chilled material upon the floor of the chamber, then placing the quarters, carcasses, or pieces of the meat, as the case may be, upon said layer, then closely packing underneath, around, and over the quantity of meat thus deposited an additional quantity of the chilled or cooled material, to a depth of two or three inches, over and above the said meat; then in like manner depositing another tier of the meat, which in like manner should be packed around and over with the cold or refrigerated material, and so on until the chamber is full to the top.

It will be observed that the meat, having been previously refrigerated, is snugly packed in and surrounded by the refrigerated material, and this, too, within a chamber the ceiling, floor, and sides of which have, so far as practicable, been rendered incapable of transmitting heat inward to the contents of said chamber. From this it follows that a quantity of cold, so to speak, is stored up within and around the meat, to insure the preservation thereof, during a very considerable period of time—a time sufficient, in fact, to permit the transportation of the meat for long distances by land or sea, it being possible to provide the chamber hereinbefore referred to either upon railway-cars on land, or upon sea-going or other vessels. Inasmuch as the quarters, carcasses, or pieces of meat, as the case may be, packed in the chilled material, as hereinbefore explained, are brought very much closer to each other than it is possible to hang them in an ordinary refrigerator or chill-room, it follows that very great economy of space during transportation, as just mentioned, is secured. Furthermore, inasmuch as in the lading of vessels with cargo the lighter freight has ordinarily to be placed on the upper decks and the heavier freight below, it follows that by my said invention meat preserved by refrigeration during transportation may be placed as heavy cargo on the lower decks of sea-going vessels, instead of being necessarily placed on the upper decks, as is the case with meat transported in ordinary chill-rooms or refrigerators. It is to be observed, further, that any suitable material may be used in lieu of the sand, and even grain (corn, wheat, barley, oats, and the like) may be refrigerated to the requisite extent, as hereinbefore described, and used for the material in which to pack the meat, as hereinbefore explained, by which means even the interstices or spaces between the quarters, carcasses, or pieces of the meat, as the case may be, and which are necessarily occupied or filled by the refrigerated material, may be used for the transportation of grain for export.

I am aware that it has been proposed to preserve meats, fish, &c., by packing the same in ice; but this I do not claim, as the same is quite different in principle and results from my said invention, inasmuch as meat if placed in immediate contact with ice is found by experience to lose its flavor, and, moreover, its more valuable juices are, to a greater or less degree, dissolved or washed out by the water resulting from the melting of the ice; while, on the other hand, if the meat be placed in a close or impervious envelope—as, for example, in an india-rubber bag—the gases, vapors, or emanations which should be allowed to escape from the meat are confined in contact therewith and tend to its decided and rapid deterioration.

What I claim as my invention is—

1. The herein-described method of preserving meat during transportation or storage by embedding the same in substantially dry refrigerated sand, grain, or equivalent material which adapts itself to the shape of the meat, substantially as herein set forth.

2. The combination, with a quarter, carcass, or piece of meat, of an envelope of fabric or fibrous material and a surrounding substantially dry refrigerated material, both the envelope and the material adapting themselves to the shape of the contained substance, substantially as and for the purpose herein set forth.

3. The combination of a chilled chamber with chilled substantially dry granular or pulverulent material—such, for example, as sand or grain—and quarters, carcasses, or pieces of meat enveloped in pervious fabric or fibrous material, substantially as and for the purpose herein set forth.

4. The method herein described of providing for the preservation of meat during storage or transportation by packing the meat, after refrigeration to a point above freezing, in a refrigerated and substantially dry granular or pulverulent material—such, for example, as sand or grain—within a refrigerated chamber, substantially as herein set forth.

JAMES A. WHITNEY.

Witnesses:
HENRY HESSE,
CHAS. H. DOXAT.